(12) United States Patent
McBride

(10) Patent No.: US 6,836,767 B2
(45) Date of Patent: Dec. 28, 2004

(54) PIPELINED HARDWARE IMPLEMENTATION OF A NEURAL NETWORK CIRCUIT

(75) Inventor: Chad B. McBride, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 09/970,002

(22) Filed: Oct. 3, 2001

(65) Prior Publication Data

US 2003/0065631 A1 Apr. 3, 2003

(51) Int. Cl.[7] .............................................. G06F 15/18
(52) U.S. Cl. ....................................................... 706/41
(58) Field of Search ............................................ 706/41

(56) References Cited

U.S. PATENT DOCUMENTS

| | | | |
|---|---|---|---|
| 4,996,648 A | 2/1991 | Jourjine | 706/40 |
| 5,140,530 A | 8/1992 | Guha et al. | 706/13 |
| 5,253,330 A * | 10/1993 | Ramacher et al. | 706/42 |
| 5,337,395 A | 8/1994 | Vassiliadis et al. | 706/42 |
| 5,426,757 A * | 6/1995 | Watanabe et al. | 711/101 |
| 5,479,574 A | 12/1995 | Glier et al. | 706/25 |
| 5,517,600 A * | 5/1996 | Shimokawa | 706/15 |
| 6,505,182 B1 * | 1/2003 | Van den Heuvel | 706/41 |
| 6,539,368 B1 * | 3/2003 | Chernikov et al. | 706/41 |
| 6,654,730 B1 * | 11/2003 | Kato et al. | 706/22 |

* cited by examiner

*Primary Examiner*—George Davis
(74) *Attorney, Agent, or Firm*—Dugan & Dugan

(57) ABSTRACT

In a first aspect, a pipelined hardware implementation of a neural network circuit includes an input stage, two or more processing stages and an output stage. Each processing stage includes one or more processing units. Each processing unit includes storage for weighted values, a plurality of multipliers for multiplying input values by weighted values, an adder for adding products outputted from product multipliers, a function circuit for applying a non-linear function to the sum outputted by the adder, and a register for storing the output of the function circuit.

17 Claims, 4 Drawing Sheets

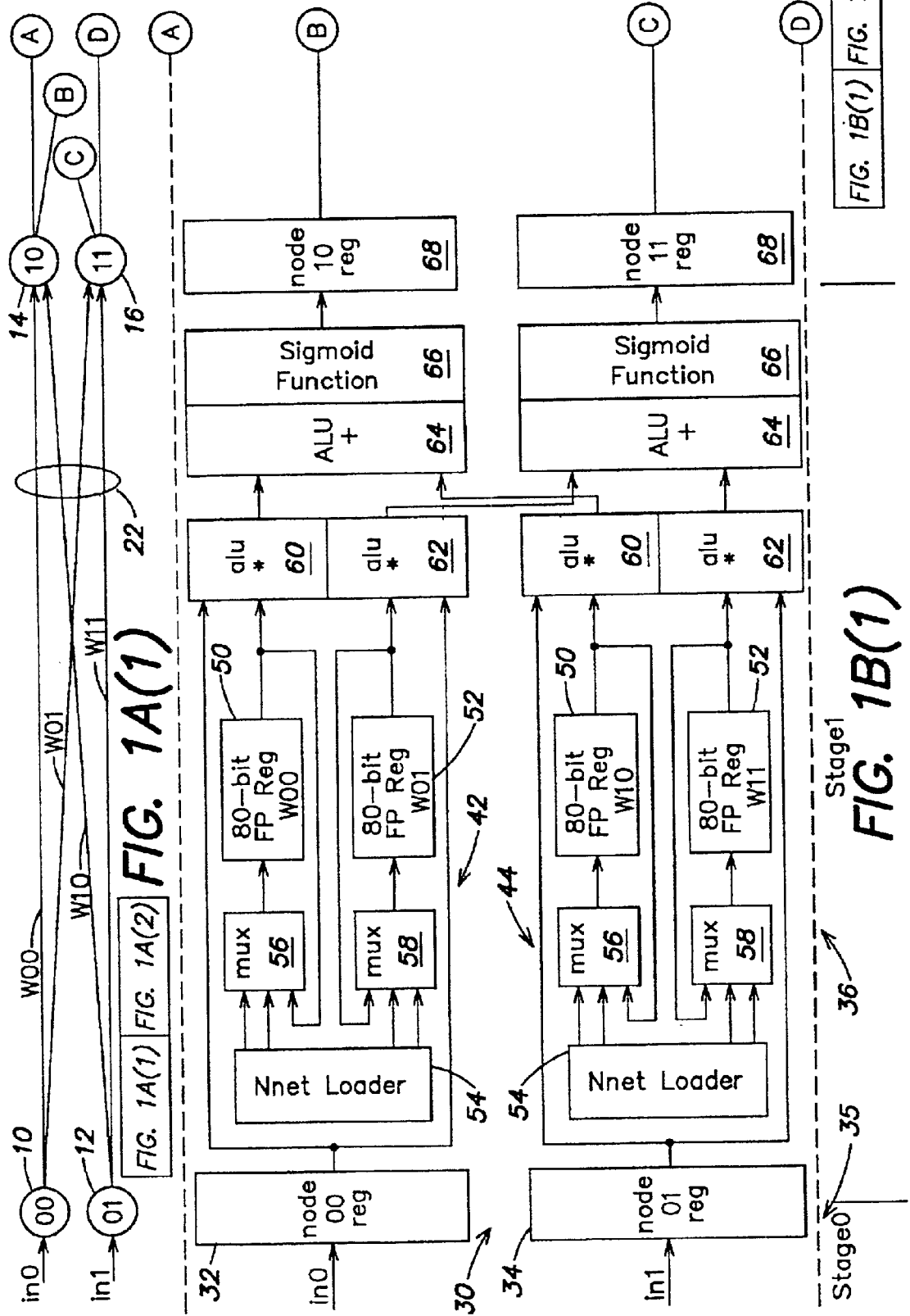

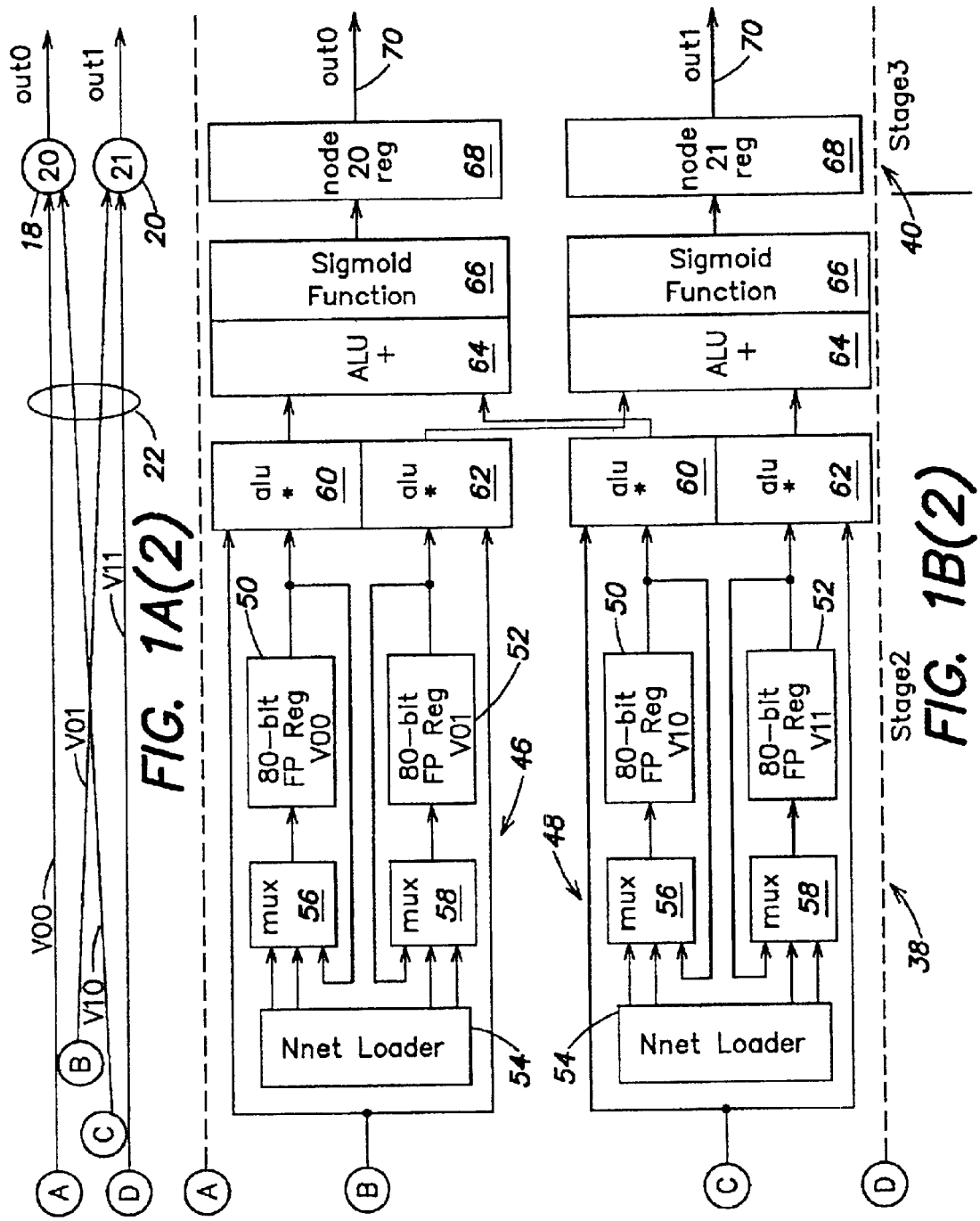

US 6,836,767 B2

PIPELINED HARDWARE IMPLEMENTATION OF A NEURAL NETWORK CIRCUIT

FIELD OF THE INVENTION

This invention is concerned with computing devices, and more particularly with devices for performing neural network processing.

BACKGROUND OF THE INVENTION

Neural networks are well known. In most applications, neural network processing is performed by a suitably programmed general purpose processor. Thus, most implementations of neural networks are software-based. However, software-based neural network processing fails to take advantage of highly parallel features of typical neural network algorithms. Furthermore, typical neural network processing completely processes a single input event prior to receiving and processing the next event. Consequently, throughput may be low.

SUMMARY OF THE INVENTION

According to a first aspect of the invention, a pipelined hardware implementation of a neural network circuit is provided. The inventive neural network circuit includes an input stage for receiving and storing input values, a first processing stage coupled to the input stage, at least one additional processing stage coupled to an upstream processing stage, and an output stage. (The upstream processing stage to which the additional processing stage is coupled may be the first processing stage.) The first processing stage includes a plurality of first processing units. Each first processing unit includes a weight store for storing a plurality of weighted values, a plurality of multipliers each for multiplying an input value by a respective weighted value, an adder for adding a product outputted from one of the multipliers with at least one product outputted from a respective multiplier of another one of the plurality of first processing units, a function circuit for receiving a sum outputted by the adder and for generating therefrom a processing unit value, and a register for storing the processing unit value generated by the function circuit. The additional processing stage includes one or more additional stage processing units. Each additional stage processing unit includes a weight store for storing a plurality of weighted values, a plurality of multipliers each for multiplying a processing unit value received from a processing unit of the upstream processing stage by a respective weighted value, an adder for adding a product outputted from one of the multipliers of the respective additional stage processing unit with at least one product outputted from a respective multiplier of another one of a plurality of additional stage processing units, a function circuit for receiving a sum outputted by the adder of the respective additional stage processing unit and generating therefrom a processing unit value, and a register for storing the processing unit value generated by the function circuit of the respective additional stage processing unit. The output stage is formed from output ports of the registers of the additional processing stage.

At least one intervening processing stage may be coupled between the first processing stage and the additional processing stage.

The additional processing stage performs calculations with respect to a first set of input values at the same time that the first processing stage performs calculations with respect to a second set of input values.

The neural network circuit also includes circuitry for loading the weighted values into the weight stores.

In accordance with a second aspect of the invention, a pipelined hardware implementation of a recall-only neural network circuit is provided. The inventive neural network circuit includes an input stage adapted to receive and store at least one input value, and a first processing stage coupled to the input stage. The first processing stage includes at least one processing unit having (1) a weight store adapted to store at least one weighted value; (2) at least one multiplier adapted to multiply an input value by a respective weighted value; (3) a function circuit coupled downstream from one or more of the at least one multiplier and adapted to receive a function input and to generate therefrom a processing unit value; and (4) a register adapted to store the processing unit value generated by the function circuit.

The neural network circuit also includes an additional processing stage coupled to an upstream processing stage. The additional processing stage includes at least one additional stage processing unit having (1) a weight store adapted to store at least one weighted value; (2) at least one multiplier adapted to multiply a processing unit value received from a processing unit of the upstream processing stage by a weighted value; (3) a function circuit coupled downstream from one or more of the at least one multiplier of the respective additional stage processing unit and adapted to receive a function input and to generate therefrom a processing unit value; and (4) a register adapted to store the processing unit value generated by the function circuit of the respective additional stage processing unit. The neural network circuit also includes an output stage including an output port of the register of the additional processing stage.

The neural network circuits of the present invention provides rapid and efficient processing of input data sets with high throughput.

Other objects, features and advantages of the present invention will become more fully apparent from the following detailed description of exemplary embodiments, the appended claims and the accompanying drawings.

BRIEF DESCRIPTION OF THE DRAWINGS

FIGS. 1A(1) and 1A(2) are a schematic representation of a neural network process to which the present invention may be applied;

FIGS. 1B(1) and 1B(2) are a block diagram representation of a neural network circuit provided in accordance with the invention;

DETAILED DESCRIPTION

Figure 2:
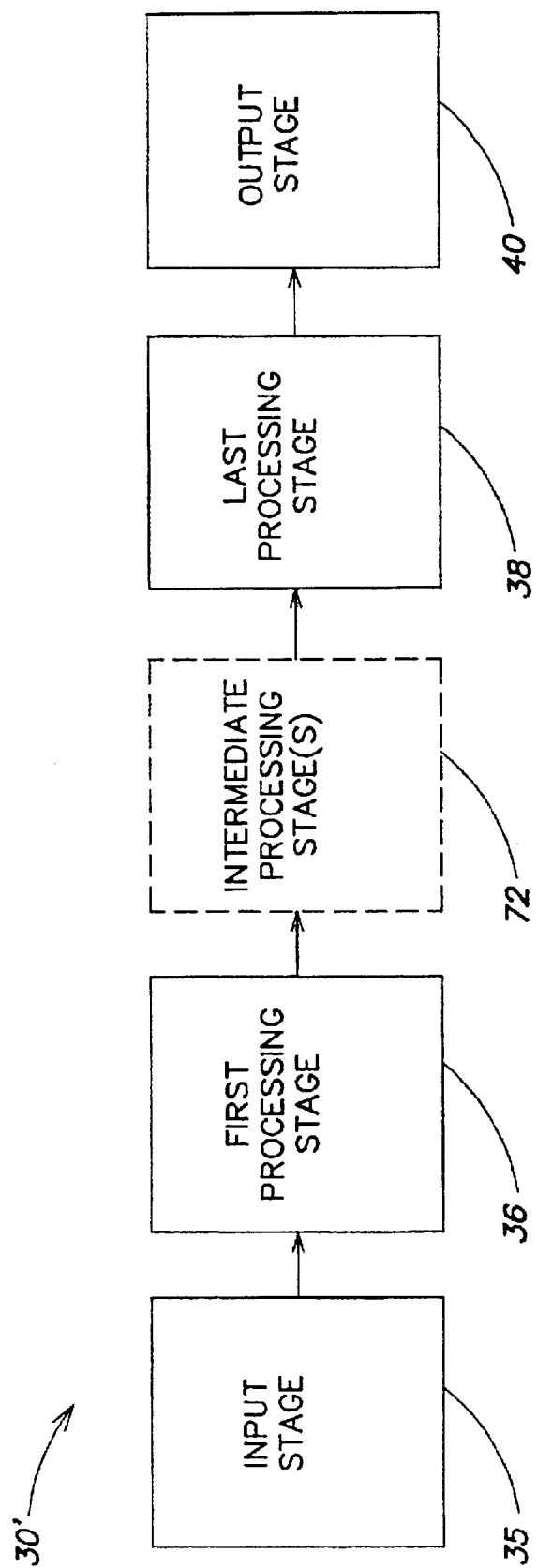
FIG. 2 is a high level block diagram representation of an alternative embodiment of the neural network circuit of FIGS. 1B(1) and 1B(2)

FIGS. 1A(1) and 1A(2) are a schematic illustration of an exemplary neural network process to which the present invention may be applied. It will be understood that the present invention may be applied to other neural network processes as well. In the process of FIGS. 1A(1) and 1A(2) there are six nodes, including input layer nodes 10 and 12, intermediate layer nodes 14 and 16, and output layer nodes 18 and 20. A set of input values (represented as in0 and in1 in FIG. 1A(1)) are provided as inputs to the input layer nodes 10, 12. The neural network process of FIGS. 1A(1) and 1A(2) has two inputs, two hidden layers, and two outputs (represented as out0 and out1 in FIG. 1A(2)). The arrows 22 represent multiplication of output values from the upstream nodes (input layer nodes 10, 12; intermediate layer nodes 14, 16) by respective weighted values (represented as W00, W01, W10 and W11 in FIG. 1A(1) and V00, V01, V10 and V11 in FIG. 1A(2)). At the downstream end of the arrows 22, summation and non-linear processing is performed at the nodes 14, 16, 18 and 20. The outputs of output layer nodes 18 and 20 constitute the outputs from the neural network process. As will be appreciated by those who are skilled in the art, the neural network process illustrated in FIGS. 1A(1) and 1A(2) is a multi-level process formed of perceptrons.

Neural network processes of this type may be applied, for example, for purposes such as pattern matching, classification, signal processing, image processing, speech processing or control functions.

FIGS. 1B(1) and 1B(2) are a block diagram illustration of a pipelined hardware implementation of the neural network process of FIGS. 1A(1) and 1A(2) ("a neural network circuit 30"), as provided in accordance with the invention.

Pipelining may be said to occur when the output of one process serves as an input to a second process, the output of the second process serves as an input to a third process, and so forth. Such processes take place simultaneously within a single cycle time.

The input layer of the neural network process of FIGS. 1B(1) and 1B(2) is represented by input node registers 32 and 34, which together constitute an input stage 35 of the neural network circuit 30. The input nodes 32, 34 respectively receive and store input data values which constitute a set of input values. The neural network circuit 30 further includes a first processing stage 36, a second processing stage 38, and an output stage 40. The first processing stage 36 includes processing units 42 and 44. The second processing stage 38 includes processing units 46 and 48.

The four processing units 42, 44, 46, 48 are substantially identical and will now be described simultaneously. Each processing unit includes two weighted value storage registers 50, 52 which store respective weighted values. The weighted value storage registers may be, as illustrated in FIGS. 1B(1) and 1B(2), 80-bit floating point registers to accommodate 10-byte extended real numbers such as are found in programming environments such as C++ or Delphi. Alternatively, other types of registers may be used, such as 64-bit IEEE floating point registers. Each processing unit also includes weighted value loading circuitry 54 and multiplexers 56, 58 for loading the respective weighted values into the weighted value storage registers 50, 52. The loading circuitry 54 may constitute, for example, a state machine that provides control and data signals to the multiplexers 56, 58, to control loading of the weighted values into the registers 50, 52.

The neural network circuit 30 is a "recall-only" processor in that the processor 30 does not support operation in a training mode. Rather, training of the neural network process may be performed in a software-based processor (not shown), and the weighted values generated by operating the software-based processor in a training mode may be loaded via the loading circuitry 54 and multiplexers 56, 58 into the weighted value storage registers 50, 52.

Also included in each of the processing units (42, 44, 46, 48) are multiplication arithmetic logic units (multipliers) 60, 62, respectively corresponding to weighted value storage registers 50, 52. Each processing unit also includes an addition arithmetic logic unit (adder) 64, a non-linear function circuit 66 and a node value storage register 68.

The multiplier 60 of processing unit 42 is coupled to receive as inputs the values respectively stored in the weighted value storage register 50 of the processing unit 42 and in the input node register 32. The multiplier 62 of the processing unit 42 is coupled to receive as inputs the values respectively stored in the weighted value storage register 52 of the processing unit 42 and in the input node register 32. The multiplier 60 of the processing unit 44 is coupled to receive as inputs the values respectively stored in the weighted value storage register 50 of the processing unit 44 and in the input node register 34. The multiplier 62 of the processing unit 44 is coupled to receive as inputs values respectively stored in the weighted value storage register 52 of the processing unit 44 and in the input node register 34. The multiplier 60 of the processing unit 46 is coupled to receive as inputs the respective values stored in the weighted value storage register 50 of the processing unit 46 and in the node value storage register 68 of the processing unit 42. The multiplier 62 of the processing unit 46 is coupled to receive as inputs the respective values stored in the weighted value storage register 52 of the processing unit 46 and in the node value storage register 68 of the processing unit 42. The multiplier 60 of the processing unit 48 is coupled to receive as inputs the respective values stored in the weighted value storage register 50 of the processing unit 48 and in the node value storage register 68 of the processing unit 44. The multiplier 62 of the processing unit 48 is coupled to receive as inputs the respective values stored in the weighted value storage register 52 of the processing unit 48 and in the node value storage register 68 of processing unit 44.

The adder 64 of processing unit 42 is coupled to receive as inputs the respective products outputted from the respective multipliers 60 of processing units 42 and 44. The adder 64 of processing unit 44 is coupled to receive as inputs the respective products outputted from the respective multipliers 62 of processing units 42 and 44. The adder 64 of processing unit 46 is coupled to receive as inputs the respective products outputted from the respective multipliers 60 of processing units 46 and 48. The adder 64 of processing unit 48 is coupled to receive as inputs the respective products outputted from the respective multipliers 62 of processing units 46 and 48.

Each non-linear function circuit 66 is coupled to receive the sum outputted by the adder 64 of the respective processing unit. The function applied to the respective sum by the function circuit 66 may be, for example, a sigmoid function as illustrated in FIGS. 1B(1) and 1B(2), and as is known in the art. Alternatively, other non-linear functions may be applied by the function circuits 66, such as a step function, a ramp function or a linear threshold function. Each of the node value storage registers 68 is coupled to receive and store the output of the non-linear function circuit 66 of the respective processing unit.

The output stage 40 is constituted by the respective output ports 70 of the node value storage registers 68 of processing units 46 and 48.

In operation, a training process is carried out in a software-based processor (not shown) to generate the weighted values to be stored in the weighted value storage registers 50, 52. The weighted values are then loaded from the software-based processor into the weighted value storage registers 50, 52 via the loading circuitry 54 and the multiplexers 56, 58. Neural network circuit 30 is then ready to operate (i.e., in a recall-only mode).

Processing by the neural network circuit 30 begins with receipt of a set of input values corresponding to an input event. The input values are respectively stored in input registers 32 and 34. Multiplier 60 of processing unit 42 multiplies the value stored in register 32 by the weighted value stored in weighted value storage register 50 of processing unit 42. At the same time, (1) multiplier 62 of processing unit 42 multiplies the input value stored in register 32 by the weighted value stored in weighted value storage register 52 of processing unit 42; (2) multiplier 60 of processing unit 44 multiplies the input value stored in register 34 by the weighted value stored in weighted value storage register 50 of processing unit 44; and (3) multiplier 62 of processing unit 44 multiplies the input value stored in register 34 by the weighted value stored in weighted value storage register 52 of processing unit 44. The products generated by the respective multipliers 60 of the processing units 42 and 44 are summed at adder 64 of processing unit 42. The products generated by the respective multipliers 62 of the processing units 42 and 44 are summed at the adder 64 of the processing unit 44. The function circuits 66 of the processing units 42 and 44 receive the sums from the respective adders 64 and apply a sigmoid function to the sums, to generate respective processing unit values, which are stored in the respective registers 68 of the processing units 42 and 44.

The processing units 46 and 48 then operate in similar fashion to the processing units 42, 44 with respect to the processing unit values stored in the registers 68 of the processing units 42, 44. The resulting values outputted from the function circuits 66 of processing units 46 and 48 are stored in respective registers 68 of the processing units 46, 48. These values are then outputted from the output ports 70 of output stage 40 to provide results of the processing of the neural network circuit 30.

Because of the pipelined nature of neural network circuit 30, the results of processing a first event may be outputted by output stage 40 at the same time a second event that follows the first event is being processed at processing stage 38, while a third event that follows the second event is being processed at processing stage 36, and input values corresponding to still another event that follows the third event are received and stored at input stage 35. The following table illustrates how a series of events may propagate through the neural network circuit 30.

TABLE 1

|  | Stage0 (Input Stage 35) | Stage1 (Processing Stage 36) | Stage2 (Processing Stage 38) | Stage3 (Output Stage 40) |
| --- | --- | --- | --- | --- |
| cycle0 | Event0 | — | — | — |
| cycle1 | Event1 | Event0 | — | — |
| cycle2 | Event2 | Event1 | Event0 | — |
| cycle3 | Event3 | Event2 | Event1 | Event0 |
| cycle4 | Event4 | Event3 | Event2 | Event1 |
| cycle5 | Event5 | Event4 | Event3 | Event2 |
| cycle6 | Event6 | Event5 | Event4 | Event3 |
| cycle7 | Event7 | Event6 | Event5 | Event4 |
| cycle8 | Event8 | Event7 | Event6 | Event5 |

As Table 1 illustrates, the neural network circuit 30 is capable of operating at high throughput.

In the exemplary embodiment of FIGS. 1B(1) and 1B(2), the neural network circuit 30 has two processing stages. However, according to other exemplary embodiments, more than two processing stages may be provided. FIG. 2 is a high level block diagram of a neural network circuit 30' which has more than two processing stages. In particular, the neural network circuit 30' of FIG. 2 has the same input stage 35, first processing stage 36, last processing stage 38 and output stage 40 as in the embodiment of FIGS. 1B(1) and 1B (2). In addition, one or more intermediate processing stages 72 are coupled between the first processing stage 36 and the last processing stage 38. Each intermediate processing stage 72 may have, for example, the same elements as were illustrated in connection with the processing stages 36, 38 shown in FIGS. 1B(1) and 1B(2). Thus embodiments of the present invention may be provided to implement neural network processes having more than two hidden layers.

Figure 3:
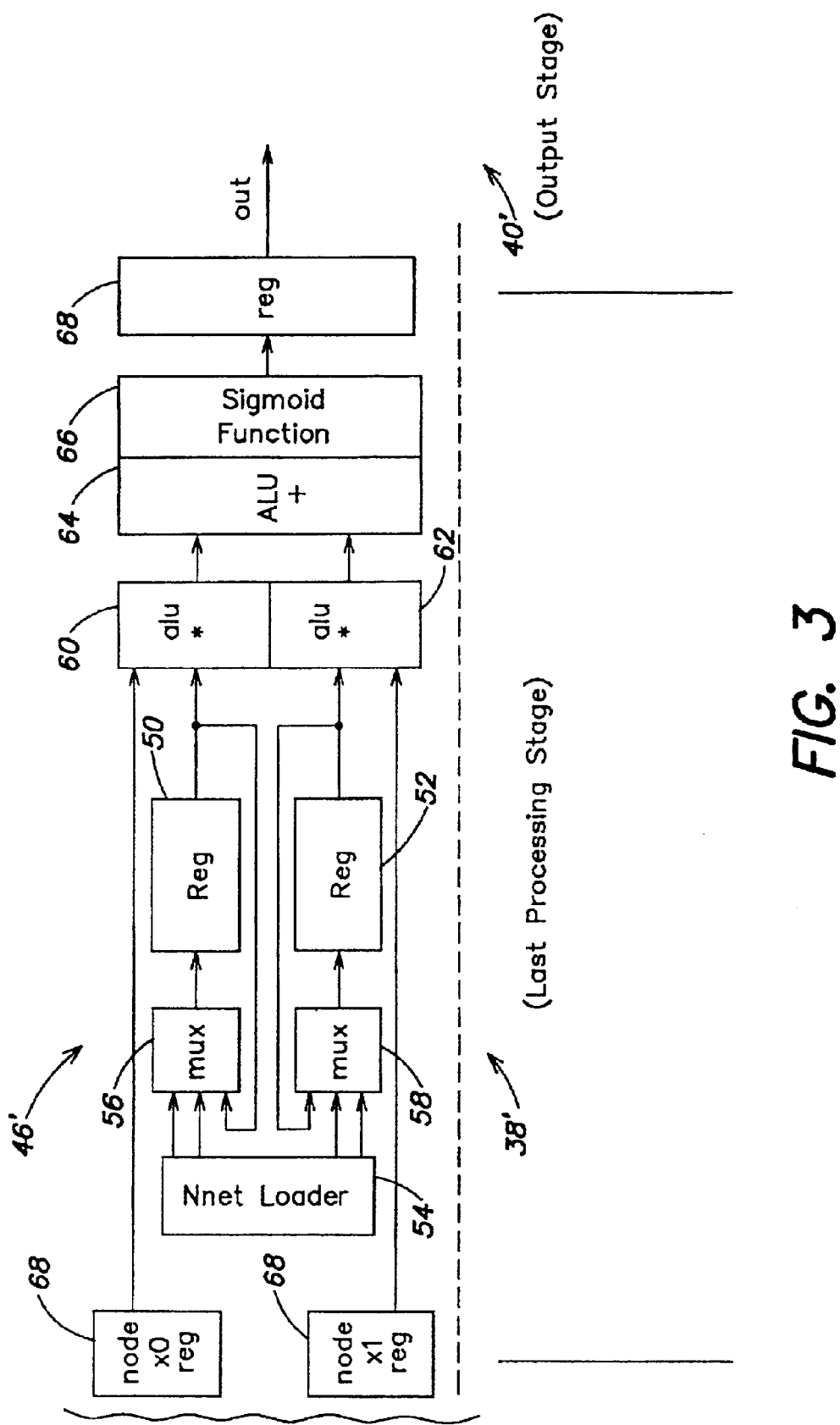
FIG. 3 is a block diagram representation of the last two stages of another alternative embodiment of the neural network circuit of FIGS. 1B(1) and 1B(2).

Moreover, although the exemplary embodiment of FIGS. 1B(1) and 1B(2) is shown as having two inputs and two outputs, it should be understood that any number of inputs and outputs may be provided. Furthermore, although two processing units are provided in each of the processing stages 36 and 38 in the exemplary embodiment of FIGS. 1B(1) and 1B(2), corresponding to two nodes per stage, it is contemplated to provide more or fewer than two nodes per stage, and consequently more or fewer than two processing units per stage. For example, FIG. 3 illustrates a portion of an alternative embodiment in which only one output is provided and, consequently, the last processing stage 38' only has one processing unit 46'. The processing unit 46' differs from the processing unit 46 shown in FIGS. 1B(1) and 1B(2) only in that the multipliers 60 and 62 are coupled to different node value storage registers 68 (e.g., the node value storage register 68 of the processing unit 42 and the node value storage register 68 of the processing unit 44 of FIGS. 1B(1) and 1B(2)), and the two inputs of the adder 64 are the products of the multipliers 60 and 62 of the same processing unit.

The foregoing description discloses only exemplary embodiments of the invention; modifications of the above disclosed apparatus and methods which fall within the scope of the invention will be readily apparent to those of ordinary skill in the art.

While the present invention has been disclosed in connection with exemplary embodiments thereof, it should be understood that other embodiments may fall within the spirit and scope of the invention, as defined by the following claims.

The invention claimed is:

1. A pipelined hardware implementation of a neural network circuit, comprising:
    an input stage for receiving and storing input values;
    a first processing stage coupled to the input stage, the first processing stage including a plurality of first processing units, each first processing unit including:
        (a) a weight store for storing a plurality of weighted values;
        (b) a plurality of multipliers each for multiplying an input value by a respective weighted value;
        (c) an adder for adding a product outputted from one of the multipliers with at least one product outputted from a respective multiplier of another one of the plurality of first processing units;
        (d) a function circuit for receiving a sum outputted by the adder and for generating therefrom a processing unit value; and
        (e) a register for storing the processing unit value generated by the function circuit;
    an additional processing stage coupled to an upstream processing stage and including a plurality of additional stage processing units, each additional stage processing unit including:

(i) a weight store for storing a plurality of weighted values;

(ii) a plurality of multipliers each for multiplying a processing unit value received from a processing unit of the upstream processing stage by a respective weighted value;

(iii) an adder for adding a product outputted from one of the multipliers of the respective additional stage processing unit with at least one product outputted from a respective multiplier of another one of the plurality of additional stage processing units;

(iv) a function circuit for receiving a sum outputted by the adder of the respective additional stage processing unit and for generating therefrom a processing unit value; and (v) a register for storing the processing unit value generated by the function circuit of the respective additional stage processing unit; and an output stage formed from output ports of the registers of the additional processing stage.

2. The apparatus of claim 1, further comprising at least one intervening processing stage coupled between the first processing stage and the additional processing stage.

3. The apparatus of claim 1, wherein the additional processing stage performs calculations with respect to a first set of input values at the same time that the first processing stage performs calculations with respect to a second set of input values.

4. The apparatus of claim 1, further comprising means for loading the weighted values in the weight stores.

5. The apparatus of claim 1, wherein the number of multipliers included in each first processing unit is equal to the number of first processing units included in the first processing stage.

6. The apparatus of claim 1, wherein the number of multipliers included in each additional stage processing unit is equal to the number of additional stage processing units included in the additional processing stage.

7. The apparatus of claim 1, wherein the function circuits apply a sigmoid function to respective sums received by the function circuits.

8. The apparatus of claim 1, wherein the function circuits apply one of a step function, a ramp function and a linear threshold function to the respective sums received by the function circuits.

9. The apparatus of claim 1 wherein the upstream processing stage is the first processing stage.

10. A method of performing a neural network process, comprising:

providing an input stage for receiving and storing input values;

providing a first processing stage coupled to the input stage, the first processing stage including a plurality of first processing units, each first processing unit including:

(a) a weight store for storing a plurality of weighted values;

(b) a plurality of multipliers each for multiplying an input value by a respective weighted value;

(c) an adder for adding a product outputted from one of the multipliers with at least one product outputted from a respective multiplier of another one of the plurality of first processing units;

(d) a function circuit for receiving a sum outputted by the adder and for generating therefrom a processing unit value; and (e) a register for storing the processing unit value generated by the function circuit;

providing an additional processing stage coupled to an upstream processing stage and including a plurality of additional stage processing units, each additional stage processing unit including:

(i) a weight store for storing a plurality of weighted values;

(ii) a plurality of multipliers each for multiplying a processing unit value received from a processing unit of the upstream processing stage by a respective weighted value;

(iii) an adder for adding a product outputted from one of the multipliers of the respective additional stage processing unit with at least one product outputted from a respective multiplier of another one of the plurality of additional stage processing units;

(iv) a function circuit for receiving a sum outputted by the adder of the respective additional stage processing unit and for generating therefrom a processing unit value; and (v) a register for storing the processing unit value generated by the function circuit of the respective additional stage processing unit;

forming an output stage from output ports of the registers of the additional processing stage; and operating the first processing stage and the additional processing stage simultaneously to process respective sets of input values.

11. A pipelined hardware implementation of a neural network circuit, comprising:

an input stage for receiving and storing input values;

a first processing stage coupled to the input stage, the first processing stage including a plurality of first processing units, each first processing unit including:

(a) a weight store for storing a plurality of weighted values;

(b) a plurality of multipliers each for multiplying an input value by a respective weighted value;

(c) an adder for adding a product outputted from one of the multipliers with at least one product outputted from a respective multiplier of another one of the plurality of first processing units;

(d) a function circuit for receiving a sum outputted by the adder and for generating therefrom a processing unit value; and (e) a register for storing the processing unit value generated by the function circuit;

an additional processing stage coupled to an upstream processing stage and including at least one additional stage processing unit, the additional stage processing unit including:

(i) a weight store for storing a plurality of weighted values;

(ii) a plurality of multipliers each for multiplying a processing unit value received from a processing unit of the upstream processing stage by a respective weighted value;

(iii) an adder for adding at least some of the products outputted from the multipliers of the respective additional stage processing unit;

(iv) a function circuit for receiving a sum outputted by the adder of the respective additional stage processing unit and generating therefrom a processing unit value; and (v) a register for storing the processing unit value generated by the function circuit of the respective additional stage processing unit; and an output stage including an output port of the register of the additional processing stage.

12. The apparatus of claim 11, further comprising at least one intervening processing stage coupled between the first processing stage and the additional processing stage.

13. The apparatus of claim 11, wherein the upstream processing stage is the first processing stage.

14. A pipelined hardware implementation of a neural network circuit, comprising:

an input stage adapted to receive and store input values;

a first processing stage coupled to the input stage, the first processing stage including a plurality of first processing units, each first processing unit including:
(a) a weight store adapted to store a plurality of weighted values;
(b) a plurality of multipliers each adapted to multiply an input value by a respective weighted value;
(c) an adder adapted to add a product outputted from one of the multipliers with at least one product outputted from a respective multiplier of another one of the plurality of first processing units;
(d) a function circuit adapted to receive a sum outputted by the adder and to generate therefrom a processing unit value; and
(e) a register adapted to store the processing unit value generated by the function circuit;

an additional processing stage coupled to an upstream processing stage and including a plurality of additional stage processing units, each additional stage processing unit including:
(i) a weight store adapted to store a plurality of weighted values;
(ii) a plurality of multipliers each adapted to multiply a processing unit value received from a processing unit of the upstream processing stage by a respective weighted value;
(iii) an adder adapted to add a product outputted from one of the multipliers of the respective additional stage processing unit with at least one product outputted from a respective multiplier of another one of the plurality of additional stage processing units;
(iv) a function circuit adapted to receive a sum outputted by the adder of the respective additional stage processing unit and to generate therefrom a processing unit value; and
(v) a register adapted to store the processing unit value generated by the function circuit of the respective additional stage processing unit; and an output stage formed from output ports of the registers of the additional processing stage.

15. A pipelined hardware implementation of a recall-only neural network circuit, comprising:

an input stage adapted to receive and store at least one input value;

a first processing stage coupled to the input stage, the first processing stage including at least one processing unit having:
(a) a weight store adapted to store at least one weighted value;
(b) at least one multiplier adapted to multiply an input value by a respective weighted value;
(c) a function circuit coupled downstream from one or more of the at least one multiplier and adapted to receive a function input and to generate therefrom a processing unit value; and
(d) a register adapted to store the processing unit value generated by the function circuit;

an additional processing stage coupled to an upstream processing stage and including at least one additional stage processing unit having:
(i) a weight store adapted to store at least one weighted value;
(ii) at least one multiplier adapted to multiply a processing unit value received from a processing unit of the upstream processing stage by a weighted value;
(iii) a function circuit coupled downstream from one or more of the at least one multiplier of the respective additional stage processing unit and adapted to receive a function input and to generate therefrom a processing unit value; and
(iv) a register adapted to store the processing unit value generated by the function circuit of the respective additional stage processing unit; and an output stage including an output port of the register of the additional processing stage.

16. The apparatus of claim 15, wherein each of the processing units includes an adder adapted to add products of multipliers coupled to the adder to produce a sum supplied as the function input to the function circuit of the respective processing unit.

17. The apparatus of claim 16, further comprising circuitry adapted to load the weighted values in the weight stores.

* * * * *